United States Patent

Francis

[11] 4,158,461
[45] Jun. 19, 1979

[54] PIPE TAPPING BANDS

[76] Inventor: Robert A. Francis, 28 Skyline Dr., Keilor, Victoria, Australia

[21] Appl. No.: 619,973

[22] Filed: Sep. 30, 1975

[30] Foreign Application Priority Data

Oct. 1, 1974 [AU] Australia ............................... PB9112

[51] Int. Cl.² ................................................ F16L 41/00
[52] U.S. Cl. ...................................... 285/111; 285/197
[58] Field of Search ............... 285/197, 198, 199, 111; 137/318

[56] References Cited

U.S. PATENT DOCUMENTS

| | | | |
|---|---|---|---|
| 1,459,030 | 6/1923 | Mueller | 285/199 |
| 2,643,138 | 6/1953 | Jacobs et al. | 285/111 X |
| 3,134,613 | 5/1964 | Regan | 285/111 X |
| 3,360,284 | 12/1967 | Ver Nooy | 285/197 X |
| 3,362,730 | 1/1968 | St. Clair et al. | 285/197 X |
| 3,471,176 | 10/1969 | Gilchrist | 285/197 X |
| 3,489,441 | 1/1970 | Malcolm | 285/197 |
| 3,840,255 | 10/1974 | Daghe | 285/197 X |

FOREIGN PATENT DOCUMENTS

| | | | |
|---|---|---|---|
| 2108155 | 9/1971 | Fed. Rep. of Germany | 285/197 |
| 390634 | 8/1965 | Switzerland | 285/197 |
| 268923 | 4/1927 | United Kingdom | 285/111 |
| 1234017 | 6/1971 | United Kingdom | 285/197 |

*Primary Examiner*—Thomas F. Callaghan
*Attorney, Agent, or Firm*—Donald D. Jeffery

[57] ABSTRACT

This invention provides a pipe tapping band of the type formed in two halves adapted to be clamped about a pipe to be tapped, one band half having an internally threaded integral ferrule to receive conventional pipe tapping means, a recess in the inner surface of the tapping band around the ferrule aperture, said recess arranged to receive and locate an apertured resilient seal between the tapping band and the outer surface of the pipe about an aperture formed therein and with said seal having peripheral lips arranged to provide sealing engagement with the tapping band and the outer surface of the pipe about the aperture therein.

1 Claim, 5 Drawing Figures

PIPE TAPPING BANDS

The present invention relates to pipe tapping bands particularly, although not exclusively, to tapping bands for water mains.

Up until several years ago, the installation of mains for household water supply was carried out by simply laying a cast iron main down each side of a street in a new sub division. Where a house was being built or to be built in the near future, a ferrule was placed in the cast iron main by drilling a hole tapped and threaded to take the appropriate ferrule. The main was then filled and water was available to the required blocks of land. When a new connection was to be made, the people in the street were advised that the water would be turned off for a period whilst the new connections were made to the mains.

The difficulty with this method was the inconvenience of turning the water off for a new connection and also the dislodgement of rust or other impurities in the mains caused considerable problems in the existing homes. These impurities caused further trouble with the advent of the newer type washing machines. The introduction of an under pressure tapping ferrule in 1957 found a ready acceptance to enable a main to be drilled under pressure and also to eliminate the effect of dislodged impurities in the main.

Under pressure tapping machines have also been used extensively to tap under pressure. The main disadvantage of both the under pressure tapping machine and self inserting valves was that they required a tapping band to be used to hold them to the main.

The following is three conventional pipe tapping methods:

(a) A two piece cast iron or other material tapping band is clamped onto the main with an "O" Ring around the tapping hole compressed onto the pipe and bolted at the joint, relying on the compression of the "O" Ring onto the pipe to form the seal which causes pre-stressing or compression set of the pipe.

(b) A two piece cast iron or other material tapping band is clamped onto the main with a circular flat rubber washer around the tapping hole compressed onto the pipe and bolted at the joint, relying on the compression of the flat washer against the pipe to form the seal which causes pre-stressing or compression set of the pipe.

(c) A one piece cast iron or other material tapping plate with a circular flat rubber washer around the tapping hole compressed onto the pipe by two "U" Bolts around the pipe to the plate causing concentrated stresses by the bolts and the seal against the pipe, relying on the compression of the seal on the pipe to form the seal.

Dry-tapping is effected by drilling a hole in the main while the water is turned off and inserting a standard ferrule.

Under-pressure main tapping is effected by drilling through an under-pressure main tapping ferrule.

Other methods used are as follows:

(d) Cast iron mains are drilled and tapped directly into the main, however quite often this is unsuitable as spun cast iron mains have hard spots which cause threading problems.

(e) Asbestos cement mains are drilled and a particular ferrule inserted with an expandable seal which protrudes inside the main. This method is unsuitable as the main cannot be cleaned and if not properly installed the seal can be damaged and the ferrule can be blown-off from the main.

(f) P.V.C. Mains are conventionally tapped by solvent welding a band around the pipe and drilling the main, however this is not suitable as the solvent requires a 24 hour curing time before tapping.

The principal object of this invention is the provision of a tapping band to overcome all the above disadvantages and to provide a superior simple-to-install tapping band incorporating an effective sealing arrangement as well as eliminating pipe stress and compression set of the pipe.

According to the invention a pipe tapping band includes two half tapping bands adapted to be clamped together about a pipe, one half band including an integral internally threaded ferrule to receive a pipe tapping means, a recess in the inner surface of the said one tapping band around the aperture of the integral ferrule, said recess arranged to receive and locate a resilient seal between the tapping band and the outer surface of the pipe, said seal having an aperture arranged in axial alignment with the integral ferrule aperture and an aperture formed in the pipe and with said seal aperture having peripheral lips adapted to effect sealing engagement with the tapping band and the outer surface of the pipe about the aperture therein. The arrangement is such that fluid pressure in the pipe presses the lips respectively against the pipe and the tapping band and as the surface pressure area of the lip against the pipe is less than the internal surface pressure area of the pipe, pre-stressing or compression set of the pipe, is eliminated.

This is particularly advantageous in the case of plastic pipes.

The resilient seal may comprise a circular ring moulded from rubber or other suitable material and having an outer peripheral flange adapted to be received in a corresponding recess in the recess in the tapping band to receive and locate the seal therein, the aperture in the seal being provided at each end with peripheral tapered lips adapted to respectively engage the tapped band and the pipe surface.

In order that the invention may be more readily understood reference will now be made to the accompanying drawings illustrating a tapping band constructed in accordance with the present invention. In these drawings.

Figure 1:
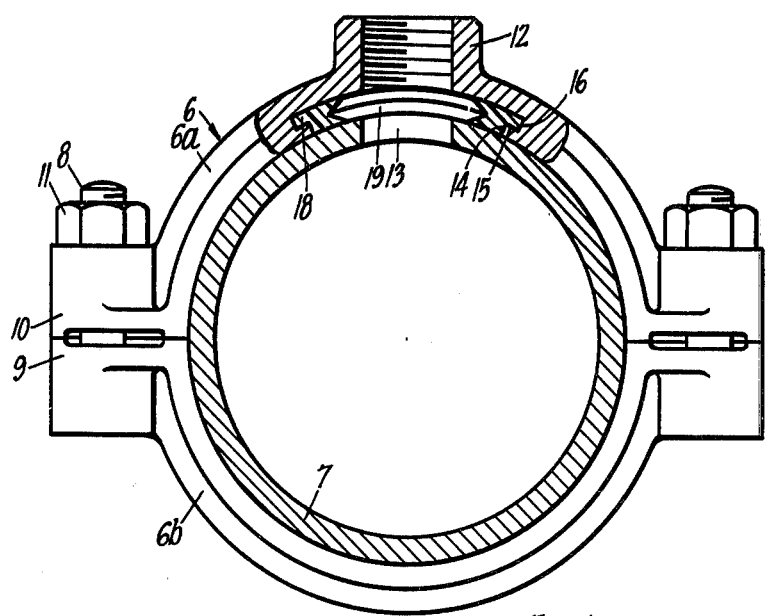
FIG. 1 is an end elevation, partly in section, of the pipe tapping band applied to a pipe, with the resilient seal in the tapping band positioned about an aperture formed by tapping means (not shown)
Figure 2:
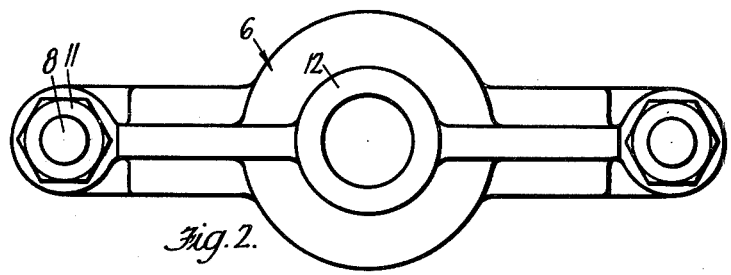
FIG. 2 is a plan view of the tapping band.
Figure 3:
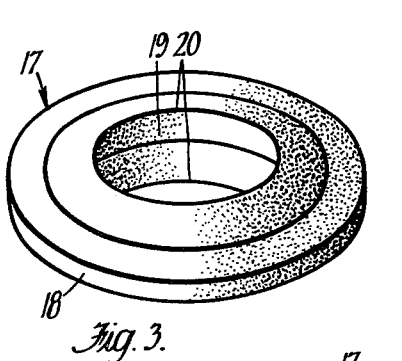
FIG. 3 is a perspective view of the resilient seal from the pipe engaging side.
Figure 4:
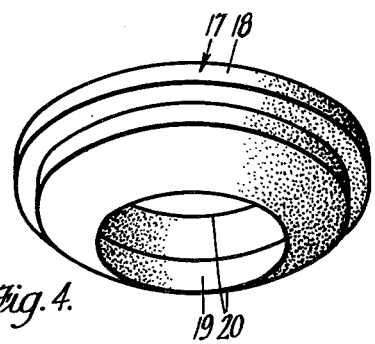
FIG. 4 is a perspective view of the seal shown in FIG. 3, from the other side.
Figure 5:
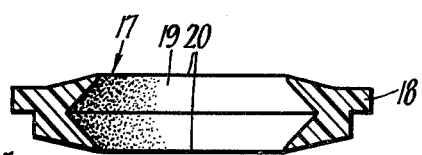
FIG. 5 is a cross-sectional elevation thereof.

As illustrated a pipe tapping band 6 comprises a divided collar adapted to embrace a pipe 7, each half tapping band 6a and 6b being clamped together by studs 8 projecting from integrally formed bosses 9 on the lower half tapping band 6b, said studs 8 passing through apertures in similar bosses 10, formed on the other half band 6a, nuts 11 on the studs 8 clamping the half bands about the pipe 7. The half band 6a is formed with an integral and internally threaded ferrule 12 adapted to receive the known form of drilling means (not shown)

for forming an aperture 13 in the pipe 7 and providing the take-off bend or the like from the pipe.

In the said tapping band half 6a and on the inner surface thereof is a circular recess 14 co-axial with the aperture in the threaded ferrule 12. The recess 14 is stepped at 15 so that the portion 16 of the recess adjacent the ferrule is of greater diameter than the recess aperture 14 adjacent the pipe to which the tapping band 6 is applied. The recess 14 is also of greater diameter than the tapped aperture 13 in the pipe.

The recess 14 is adapted to receive a circular resilient seal 17 moulded, for example, from high nitride rubber, the outer periphery of the seal is formed with a peripheral flange 18 adapted to seat in the inner stepped portion 16 of the recess in the tapping band to locate the seal in operative position. A central aperture 19 in the seal 17 is arranged to be co-axial with the ferrule aperture and the aperture 13 made in the pipe and said seal aperture 19 is in section of V-shape so that peripheral lips 20 are formed at each end of the seal aperture 19.

The two sections 6a and 6b of the tapping band 6 are made so that on completely tightening the nuts 11 sufficient pressure is applied to the seal 17 so that one lip 20 seals on the inner surface 21 of half band 6a around the ferrule aperture and the opposite lip 20 seals on the outer surface of the pipe around the aperture 13 drilled in the pipe 7.

This engagement immediately provides a fluid tight seal and upon pressure fluid entering the pipe fluid pressure further forces the lips of the seal respectively against the tapping band and the pipe surface to ensure a fluid tight seal. The internal diameter of the tapping band is such to be slightly greater than the outside diameter of the pipe for which the band is made and thereby avoiding any clamping stress on the pipe.

The above is particularly advantageous when the tapping band is applied to P.V.C. or polythene pipes as convential tapping bands applied to these pipes to make a seal by an "O" ring is sufficient to cause distortion of the pipe particularly when the U bolt type of clamp is used. In the case of P.V.C. pipes it has been found that the distortion caused by the "O" ring type of saddle will eventually cause fracturing of the pipe over a period of time.

The seal 17 according to the present invention has many advantages over previously known forms of seals in tapping bands in that the lip formation 20 is self-sealing by the action of the fluid pressure in the pipe. Furthermore the surface pressure area of a lip 20 against the pipe is less than the internal pressure area of the pipe thereby eliminating pre-stressing or compression set of the pipe.

The arrangement providing for positive location of the seal in the recess in the tapping band half ensures correct location of the seal at all times even in difficult tapping band installation conditions.

What I claim is:

1. A pipe tapping band including two half tapping bands adapted to be clamped together about a pipe, one half band including an integral internally threaded ferrule to receive a pipe tapping means, the inner surface of said one half band being formed with an annular recess around the aperture of the ferrule, said recess including a shoulder whereby the portion of the recess adjacent the ferrule is of greater diameter than the portion of the recess radially inwardly of the shoulder and adjacent the pipe to which the tapping band is applied, said portion of said recess of greater diameter being generally rectangular in cross-section, an annular resilient seal in said recess, said seal having an outwardly extending peripheral flange generally rectangular in cross-section adapted to seat in the portion of said recess having the greater diameter, and a peripheral portion of lesser diameter adapted to seat in the portion of the recess radially inwardly of said shoulder, said seal having a central aperture V-shaped in cross-section in axial alignment with the ferrule aperture and an aperture formed in the pipe, said seal aperture being defined by annular tapered peripheral lips likewise generally V-shaped in cross-section adapted to respectively effect sealing engagement with the tapping band around the ferrule aperture and the outer surface of the pipe around the aperture therein, the outer surface of one peripheral lip merging into the outer surface of said peripheral flange so as to form a continuous uninterrupted seal line when said seal is in operative position, and the outer surface of said other peripheral lip forming a linear continuation of the outer surface of said peripheral portion of lesser diameter of said seal so as to similarly form a continuous uninterrupted seal line when said seal is in operative position the surface pressure area of said other peripheral lip being less than the internal surface pressure area of said pipe, thereby eliminating pre-stressing or compression set of the pipe.

* * * * *